United States Patent Office 3,454,633
Patented July 8, 1969

3,454,633
PERFLUOROVINYLACETYL FLUORIDE
Larry Keene Blair, Barnett's Creek, Ky., and Walther Gustav Grot, Claymont, Del., assignors to E. I. du Pont de Nemours and Company, Wilmington, Del., a corporation of Delaware
No Drawing. Filed Dec. 30, 1966, Ser. No. 605,996
Int. Cl. C07c 53/14
U.S. Cl. 260—544                    7 Claims

ABSTRACT OF THE DISCLOSURE

Perfluorovinylacetyl fluoride and the process for its preparation which comprises contacting perfluoroglutaric anhydride vapor with alkali metal fluorides at elevated temperature.

---

This invention relates to fluorocarbon monomers, and, more particularly, to a terminally unsaturated perfluorinated monomer and its preparation.

The prior art describes many unsaturated fluorocarbon monomers and the resins resulting from polymerization and copolymerization thereof. These resins are useful, for example, in molding shaped articles.

The present invention provides, as a new composition of matter, a terminally unsaturated fluorocarbon compound. This invention also provides a process for the synthesis thereof. The compound of this invention can be polymerized, or copolymerized with other fluorocarbon monomers, according to any of the conventional techniques described in the art. Illustrative of such synthetic methods are the nonaqueous techniques as described in U.S. Patent 3,041,317, issued to H. H. Gibbs and R. N. Griffin on June 26, 1962; and the aqueous techniques described in U.S. Patent 2,393,967, issued to M. M. Brubaker on Feb. 5, 1946, and in U.S. Patent 2,559,752, issued to K. L. Berry on July 10, 1951.

The fluorocarbon monomer of this invention is perfluorovinylacetyl fluoride, $CF_2{=}CFCF_2COF$, which is a gas at room temperature under atmospheric pressure. The process of the present invention comprises contacting perfluoroglutaric anhydride vapor with an alkali metal fluoride and recovering perfluorovinylacetyl fluoride.

The reaction is conducted at elevated temperature in either a closed vessel or in a flow type reaction tube. In a preferred embodiment, the compound of this invention is synthesized by passing perfluoroglutaric anhydride and an inert carrier such as dry nitrogen through a bed of alkali metal fluoride held at elevated temperature at a temperature in the range 240–260° C. (The bed, prior to passage of the anhydride therethrough, is preferably held at reaction temperature overnight while passing nitrogen therethrough to dry the reaction system.) The product can be removed from the nitrogen stream, after passage of the stream through the alkali metal fluoride bed, with a trap held at low temperature, preferably at or below −80° C. The product can then be purified by any of the known techniques, i.e., gas chromatography.

The preferred alkali metal fluorides employed herein are the fluorides of sodium, potassium rubidium, and cesium. The optimum fluoride is sodium fluoride.

It is obvious that the reaction bed can contain, in addition to alkali metal fluoride, inert fillers such as glass beads.

The following example is presented to illustrate but not to restrict the present invention. Percentages and parts are by weight unless otherwise specified.

Perfluoroglutaric anhydride, the starting material from which the compound of this invention was synthesized, was prepared as follows. To a suspension of 60 grams of sodium carbonate in 250 ml. of diglyme in a three-necked flask equipped with a motor-driven stirrer, dropping funnel, and reflux condenser, was added 153 grams of perfluoroglutaryl chloride. The mixture was refluxed in a nitrogen atmosphere with stirring overnight. Then a distillate boiling at 70–72° C. under an atmosphere of gaseous nitrogen was collected. There was obtained 98 grams of perfluoroglutaric anhydride, an 80% yield based upon perfluoroglutaryl chloride.

Perfluorovinylacetyl fluoride was then prepared as follows. A vertically-mounted tube, 18 mm. in inside diameter and 200 mm. long, was filled with sodium fluoride pellets having an average particle diameter of one-eighth of an inch. Above the sodium fluoride bed were placed sucessive layers of glass wool, glass helices, and glass wool. The bed was surrounded by a furnace, the temperature of which was monitored with a thermocouple. Oxygen-free dry nitrogen was passed through the sodium fluoride bed, which was held at a temperature in the range 245–260° C., then through a trap which was filled with glass helices and had been cooled to −80° C. The nitrogen then exited the system through a bubbler.

After the bed had been conditioned overnight by passage therethrough of nitrogen at 240–260° C., perfluoroglutaric anhydride (prepared as described above) was injected through the wall of the nitrogen inlet tube and into the nitrogen stream (the nitrogen flow was about 10–15 ml. per minute) at the top of the bed with a syringe employing a 2-foot long No. 22 needle. A motor-driven syringe was employed to permit addition of perfluoroglutaric anhydride at a slow rate, i.e., about 1 ml. of liquid per hour. Thus, the anhydride vaporized from the tip of the needle and passed through the heated bed.

The product mixture which was collected in the −80° C. trap was separated by gas chromatography at 25° C. through a 40-foot column packed with 75% of an inert solid support and 25% HFPO oils, i.e., oils of the composition

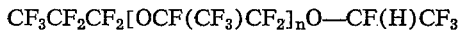
$$CF_3CF_2CF_2[OCF(CF_3)CF_2]_nO{-}CF(H)CF_3$$

A product yield in the range 10–30% was obtained.

The product of this reaction, perfluorovinylacetyl fluoride as prepared above, is a gas at room temperature and a white solid at −196° C. The perfluorovinylacetyl fluoride prepared herein has the following spectral characteristics. The infrared spectrum of perfluorovinylacetyl fluoride, observed on a vapor-phase sample, includes an absorption at 5.31 microns due to the functional group —C(O)F, and an absorption at 5.58 microns indicating the presence of terminal unsaturation in the compound, i.e., the group —CF=CF₂. This terminally unsaturated group is distinguished from internal unsaturation which is known to absorb in the infrared at higher wave lengths.

The fluorine-19 magnetic resonance spectrum, observed at room temperature on a sample of liquid perfluorovinylacetyl fluoride (which was under pressure in a sealed tube) using a Varian Associates Model A60 spectrometer, included the following absorptions (referred to CCl₃F as an external standard): an absorption at −15.3 p.p.m., due to the group —C(O)F; an absorption +119.1 p.p.m., due to —$CF_2$—; an absorption at +190.8 p.p.m., which is in the range characteristic of —CF= or —CF<; and an absorption at +107.6 p.p.m., due to =$CF_2$. The relative intensities of the above-named absorptions indicate the presence of equal numbers of the respective functional groups. Thus, the structure of the compound of the instant invention is indicated to be $CF_2$=$CFCF_2COF$.

The foregoing detailed description has been given for clearness of understanding. The invention is not limited to the exact details shown and described since obvious modifications will occur to those skilled in the art.

We claim:
1. Perfluorovinylacetyl fluoride.
2. A process for preparing perfluorovinylacetyl fluoride which comprises contacting perfluoroglutaric anhydride vapor with an alkali metal fluoride and recovering perfluorovinylacetyl fluoride.
3. A process according to claim 2 wherein the temperature of said process is in the range 240–260° C.
4. A process according to claim 3 wherein the alkali metal fluoride is sodium fluoride.
5. A process according to claim 2 wherein said alkali metal fluoride is potassium fluoride.
6. A process according to claim 2 wherein said alkali metal fluoride is rubidium fluoride.
7. A process according to claim 2 wherein said alkali metal fluoride is cesium fluoride.

References Cited

England et al.: Chem. Abs., vol. 63, p. 14690h.

LORRAINE A. WEINBERGER, *Primary Examiner.*

JAMES H. NIELSEN, *Assistant Examiner.*